United States Patent [19]

Estopinal, Jr.

[11] 4,342,736

[45] Aug. 3, 1982

[54] REDUCTION OF THE DEGRADATION OF REFRACTORIES IN A CARBON BLACK REACTOR

[75] Inventor: Earl J. Estopinal, Jr., Monroe, La.

[73] Assignee: Columbian Chemicals Company, Tulsa, Okla.

[21] Appl. No.: 269,249

[22] Filed: Jun. 1, 1981

[51] Int. Cl.$^3$ .......................... C01B 31/02; C09C 1/48
[52] U.S. Cl. ..................................... 423/450; 423/449
[58] Field of Search ............... 423/449, 450, 455, 456; 422/150

[56] References Cited

U.S. PATENT DOCUMENTS

| | | | |
|---|---|---|---|
| 2,599,981 | 6/1952 | Ekholm | 423/455 |
| 3,490,869 | 1/1970 | Heller | 423/455 |
| 3,989,803 | 11/1976 | Henderson | 423/450 |

Primary Examiner—O. R. Vertiz
Assistant Examiner—Gregory A. Heller
Attorney, Agent, or Firm—Walter M. Benjamin

[57] ABSTRACT

Disclosed is a method of producing carbon black by subjecting to a separation step a hydrocarbon feedstock containing a meltable solid, clarifying the hydrocarbon of the meltable solid and thereby making a concentrate of hydrocarbon and the meltable solid, and whereas the clarified hydrocarbon is introduced into the oil furnace process reactor to be converted to carbon black. The improvement lies in introducing the concentrate into the reaction zone of the reactor at a point where the temperature is below the melting point of the meltable solid. Carbon black is produced from the clarified oil and the oil concentrated with the meltable solid without substantially depositing the melted solid on the interior walls of the reactor.

16 Claims, 2 Drawing Figures

REDUCTION OF THE DEGRADATION OF REFRACTORIES IN A CARBON BLACK REACTOR

BACKGROUND OF THE INVENTION

This invention relates to the production of carbon black. More particularly, this invention relates to minimizing the degredation of the carbon black reactor refractory from the action of meltable solids contained in hydrocarbon feedstocks. Even more particularly, this invention relates to the recovery of a hydrocarbon/ash concentrate while reducing deposits of ash on the interior of the carbon black reactor.

Carbon black feedstocks for the "oil furnace process" are most often obtained from a fluid catalytic cracking operation employing a silica alumina or similar catalyst system. By "oil furnace process" it is meant a process for making industrial, tire carcass or tire tread grade carbon blacks. In the fractionation of the effluent from the fluid catalytic cracker, the bottom product, frequently called a slurry, contains a suspended quantity of very finely divided catalyst. Much of the catalyst is removed by settling or clarifying, but these bottoms commonly contain from about 0.04% to about 0.1% finely divided catalyst, or ash, and other solids. These clarified bottoms are normally the source of feedstocks for the production of carbon black by the oil furnace process.

Before these feedstocks can be charged to the carbon black reactor, the ash and other solids content must be reduced to a lower level, i.e., at least below about 0.03%. Higher levels of ash and other solids result in excessive deposition on and attack of the surface of the reactor refractory liner, with eventual deterioration of the refractory liner in the combustion and reaction zones. This deterioration results from both a softening of the surface of the refractory liner, as well as deformation in the refractory dimensions within the combustion and reaction zones. This deformation generally restricts flows, changes flow patterns, and increases pressure drop (energy loss) through the reactor. Hence, this condition is to be avoided.

It is avoided by reducing the ash and other solids content of the feedstock to below about 0.03% by weight. There are several ways to remove these solids, e.g., by centrifuging. From the centrifuge, a sludge containing a hydrocarbon/ash concentrate comprising from about 1% to about 3% of the feedstock is generated. The centrifuged hydrocarbon is charged to the reactor and the sludge may be discarded. However, for the typical sized carbon black plant, discarding the hydrocarbon contained in the sludge may represent an annual loss of several hundred thousand dollars at today's price of feedstocks. It is therefore desired that this material be recovered.

SUMMARY OF THE INVENTION

It has been found that all of the ash containing feedstock can be charged to the reactor without a slag buildup on the surface of the refractory liner, either in the combustion zone or the reaction zone. This is accomplished by simply introducing into the reactor a secondary oil spray downstream from the combustion zone, at a point of predetermined temperature. The hydrocarbon/ash concentrate from the discharge of the centrifuge is charged into the reactor through this secondary oil spray in a zone in which the temperature is below the softening and melting temperature of the ash, and in such a manner that the oil will not impinge on the refractory wall. Thus, carbon black is produced from the hydrocarbon/ash concentrate in the reaction zone, and solid ash is emitted from the reactor, along with the combustion gases and carbon black, rather than being deposited on the surface of the interior refractory liner of the reactor. Minimal adjustment in overall operating conditions is necessary. Adjustments involve slight increase in contact time, and a slight adjustment in the primary feedstock rate.

All of this can be accomplished without exceeding the specified maximum allowable percentage of ash in the product, e.g. in excess of 1% by weight. The integrity of the carbon black product, in its end use, is not significantly affected, while the benefit is great, e.g. several hundred thousand dollars per annual savings at today's prices for feedstocks. Moreover, this method can be used for all grades of carbon blacks and in all oil furnace process reactors.

BRIEF DESCRIPTION OF THE DRAWING

The invention is described further by way of the examples with reference to the drawing in which.

DETAILED DESCRIPTION OF THE INVENTION

Figure 1:
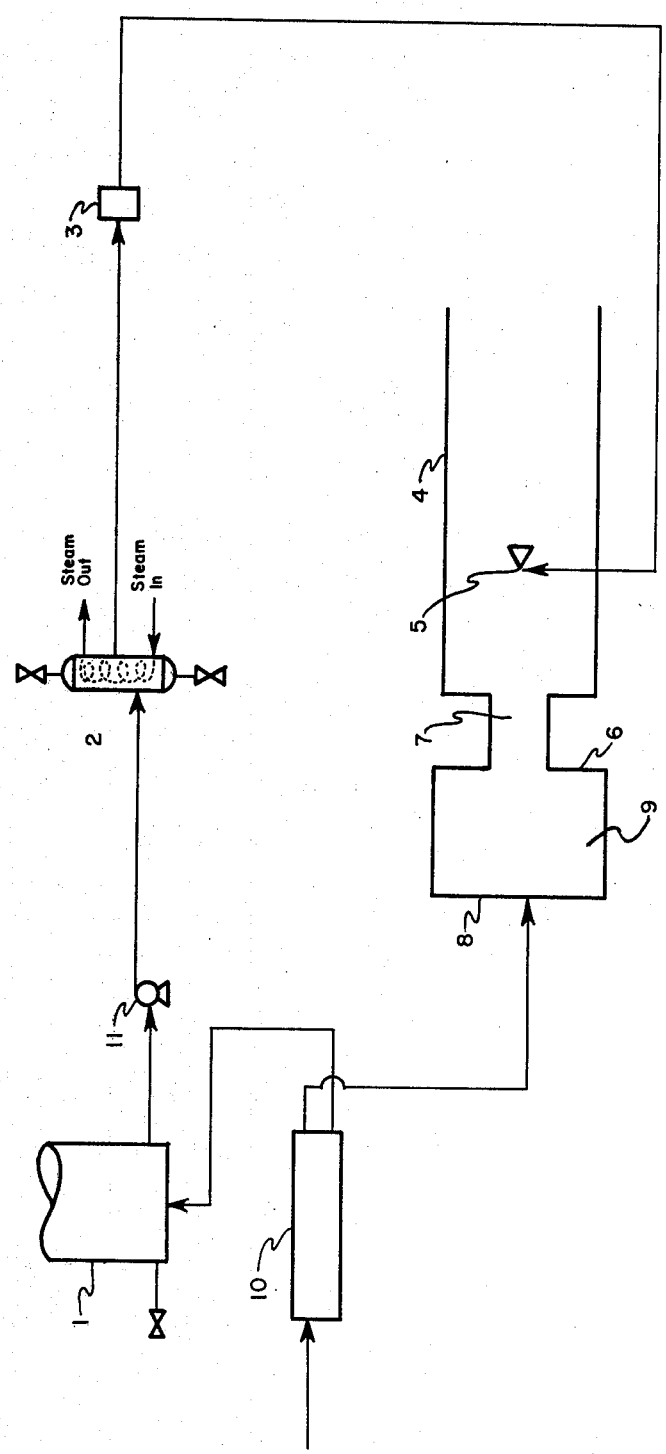
FIG. 1 is a schematic diagram showing a tire tread grade carbon black reactor feed system.

According to the present invention a carbon black feedstock comprising residual and cycle oils derived from a wide variety of distillation and cracking and reforming operations and the like, whereby a substantial amount, e.g., from about 0.04% to about 0.1%, of catalyst fines or ash is contained therein, is subjected to a separation step, e.g. centrifuging, to reduce the ash content to below about 0.03% by weight. Below this amount, a satisfactory refractory liner life can be expected as slagging on the refractory liner surface is at a minimum. This percentage may vary depending upon the particle size and density of the ash material. Those who are skilled in the art can ascertain the maximum percentage of ash allowed in the primary feedstock spray so that the life of the refractory is satisfactory.

The hydrocarbon/ash concentrate, containing from about 0.1% to about 0.3% ash by weight from the separation step, will comprise anywhere from less than about 1% to more than about 4% of the feedstock charged to the separation step. The clarified feedstock contains less than about 0.03% ash.

This clarified hydrocarbon feedstock is introduced into the carbon black reactor in the conventional manner, i.e., it is sprayed in an atomized stream into a chamber (combustion chamber) highly heated to a typical range between about 1400° C. and 1700° C. The droplets are vaporized virtually instantaneously and decomposed to agglomerated carbon black particles and combustion gas products which are quenched, and from which carbon black is collected downstream of this reaction.

The type of carbon black reactor may be any style as long as there is a point downstream of the combustion zone where the temperature is below the melting point of the ash and where there is a reaction zone long enough downstream for the conversion of the hydrocarbon in the concentrate to carbon black. These reactors include industrial, tire carcass and tire tread type oil furnace process reactors. The carcass reactor is preferred for the recovery system because of its dimensional considerations versus the tread reactor, and its normally expected higher production rates. The ratio of the rate of hydrocarbon/ash concentrate to primary feedstock, for the carcass black reactor can be greater than that of a tread black reactor without significant quality effects.

The hydrocarbon/ash concentrate is introduced into the reactor through a conventional make spray arrangement at a point downstream of the combustion zone where the temperature is below the melting point of the ash. It is preferred that the secondary to primary feed ratio is less than about 1/5. This provides a minimal amount of disruption of the primary oil conversion. In a conventional tread black reactor, for example, this injection point would be downstream of the constricted section. It would be readily understood that impingement of the spray against the walls of the reactor is to be avoided since this produces coke, a product contaminant. The spray may be axially introduced at an angle perpendicular to the stream of combustion gases or tangentially introduced, dependent on the reactor geometry. Other methods of introduction are also possible. Preferably the make spray is designed, and oil/ash concentrate is introduced, so as to enhance thorough mixing of the concentrate with the carbon black and gaseous mixture already formed in the early reaction zone. This make spray apparatus may be cooled in the conventional manner to avoid heat damage to the portion of the spray tube that is inside the reactor.

The hydrocarbon content of the hydrocarbon/ash concentrate is decomposed into carbon black, while the ash is carried along with the combustion gases and carbon black produced. The reaction may be quenched conventionally by heat exchangers or introduction of a stream of water into the downstream region of the reactor. The reactor gases, having carbon black and ash suspended therein, are withdrawn from the end of the reactor chamber and the carbon black and ash are recovered therefrom as in conventional practice.

In a carbon black plant where more than one reactor is operated, the hydrocarbon/ash concentrate may need only be introduced into one reactor. This can reduce the capital cost for installation of separate systems. In this case, however, the product from all the reactors should be thoroughly mixed (as normally mixing occurs in a common duct as well as other common downstream processes equipment) to avoid some portion of the product having too high concentrations of ash. Hence, this invention offers a method to or maximizing the control of ash introduced into the product via the feedstock.

The following example is described for illustrative purposes of a particular embodiment of the present invention and is not intended to limit the scope of the inventive concept.

EXAMPLE I

A feedstock containing about 0.06% ash is fed into a centrifuge at a rate of 3,000 gallons per hour. The clarified hydrocarbon is withdrawn at a rate of 2,940 gallons per hour and contains 0.03% ash. The hydrocarbon/ash concentrate is withdrawn from the centrifuge at a rate of 60 gallons per hour and contains 1.48% ash.

Figure 2:
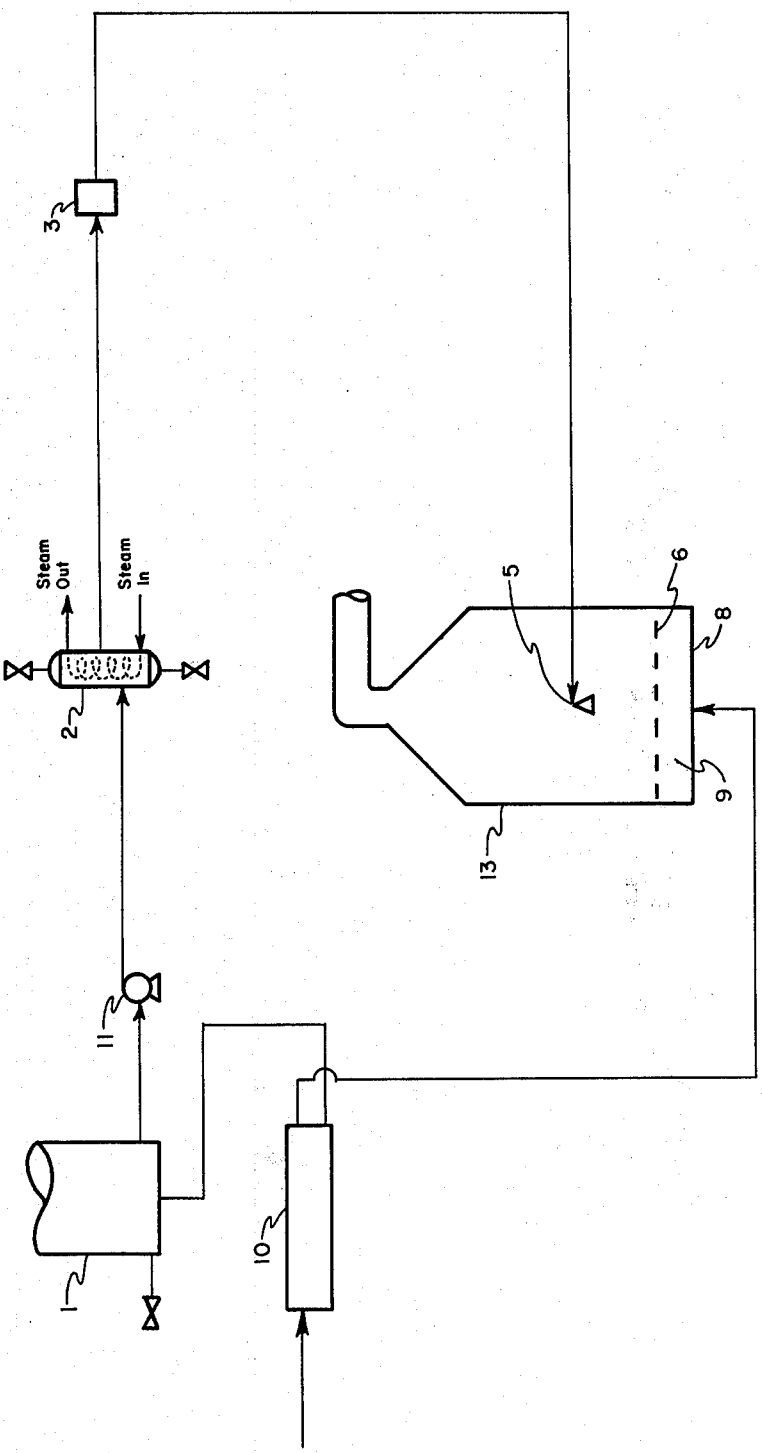
FIG. 2 is a schematic diagram showing a tire carcass grade carbon black reactor feed system.

Reference is now made to the drawings which shows a hydrocarbon/ash concentrate storage tank 1 from which the hydrocarbon is pumped to heater 2. This heater 2 heats the hydrocarbon/ash concentrate from 100° to 300° F. at which approximate temperature the hydrocarbon/ash concentrate is metered at meter system 3 and fed into oil furnace carbon black reactor 4 or 13 of FIG. 1 and FIG. 2, respectively, through secondary make oil spray 5 at a ratio of 1/5 to the primary feedstock. In FIG. 1, spray 5 is a water jacket cooled spray inserted into reactor 4 at a right angle and fitted with an appropriate spray nozzle. In FIG. 2, spray 5 shows the introduction of the hydrocarbon/ash concentrate perpendicular to the stream of carbon black laden gases. Cooling of the spray is accomplished by a refractory shield as it does not extend into the reactor gas stream. Spray 5 is positioned downstream of the face 6 of the restricted section 7 of reactor 4 (Approx. 4.5 ft.).

Primary feedstock is introduced into the front 8 of reactor 4 into the combustion zone 9 on the order of 5 times the rate of that of the hydrocarbon/ash concentrate. The remainder of the primary make oil is fed into separate reactors not equipped with the secondary spray. The overall effect of this hydrocarbon/ash recovery on the product is an increase in product ash to a controlled level not to exceed specification maximum, less than 1.0 wgt.%.

It can be seen that without this invention, at a price of $30 or higher per barrel of feedstock and at a rate of an average size carbon black plant, several hundred thousand dollars per year would be lost.

EXAMPLE II

In a 4 reactor operation, make oil spray containing 0.03% ash is fed into 4 tire carcass grade carbon black reactors at a normal rate. Carbon black is produced at a rate of 5 lbs. carbon black per gallon of feedstock oil. One of the 4 reactors (see reactor 13 of FIG. 2) is operated with a secondary make oil spray as in Example I and FIG. 2 for introduction of all of the hydrocarbon/ash concentrate which contains 1.5% ash, and otherwise in accordance with the present invention. The total production of all the reactors is combined in a single transport duct. The total ash output from all reactors are homogenously blended, resulting in the percentage ash on the final product of 0.15% which is tolerable when dispered thoroughly throughout all of the carbon black product.

It can readily be seen that there are many modifications to the present invention without departing from its concept. Feedstocks to the carbon black reactor can include other hydrocarbons besides residual oil, e.g., solvent refined coal. Various methods of separation of the meltable solid, which includes materials other than ash, are possible without departing from the essence of the present invention. Therefore these described embodiments are not intended to be limiting on the scope of the invention.

What is claimed is:

1. In a method of producing carbon black for subjecting to a separation step a hydrocarbon feedstock containing a meltable solid, withdrawing from the separation step feestock reduced in the meltable solid content and withdrawing from the separation step a hydrocarbon concentrated with the meltable solid, wherein the feedstock reduced in the meltable solid content is introduced into an oil furnace process reactor having a combustion zone and a reaction zone to produce carbon black, the improvement comprising introducing the hydrocarbon concentrated with the meltable solid into the reaction zone downstream of the combustion zone at a point where the temperature is below the melting point of the meltable solid such that the meltable solid is emitted from the reactor along with combustion gases and the carbon black product thereby producing carbon black from the oil concentrated with the meltable solid without substantially depositing the melted solid on the interior walls of the reactor.

2. The method of claim 1 wherein the meltable solid is ash.

3. The method of claim 1 wherein the separation step is a centrifuge.

4. The method of claim 1 wherein the hydrocarbon concentrated with the meltable solid is introduced into the reactor downstream of the combustion zone in the reactor.

5. The method of claim 1 wherein the hydrocarbon concentrated with the meltable solid is introduced at a point where the temperature is the hottest temperature below the melting point of the meltable solid.

6. The method of claim 1, wherein the hydrocarbon concentrated with the meltable solid is introduced tangentially into the reactor.

7. The method of claim 1, wherein the hydrocarbon concentrated with the meltable solids is introduced perpendicular to the axis of the reactor.

8. The method of claim 1, wherein the hydrocarbon concentrated with the meltable solid is introduced such that it does not impinge upon the surface of the interior of the reactor.

9. The method of claim 1, wherein the reactor is a tire tread carbon black oil furnace reactor.

10. The method of claim 1, wherein the reactor is a tire carcass carbon black oil furnace reactor.

11. In a method of producing carbon black by subjecting to a centrifuge a liquid hydrocarbon oil feedstock containing ash, withdrawing from the centrifuge an oil feedstock reduced in ash content and withdrawing from the centrifuge an oil concentrated in ash content, wherein the feedstock reduced in ash content is introduced into an oil furnace process reactor to produce carbon black, the improvement comprising introducing the oil concentrated in ash into the reactor downstream of a combustion zone at a point where the temperature is below the melting temperature of the ash such that the ash is withdrawn from the reactor along with combustion gases and the carbon black product thereby producing carbon black from the oil concentrated with ash without depositing melted ash on the interior walls of the reactor.

12. The method of claim 11 wherein the ash is catalyst fines.

13. The method of claim 11 wherein the hydrocarbon feedstock contains between about 0.04% to about 0.1% ash by weight.

14. The method of claim 11 or 13, wherein the oil concentrated with ash contains between about 1% to about 3% ash by weight.

15. The method of claim 11 or 13, wherein the oil reduced in ash content contains less than about 0.03% by weight.

16. The method of claim 1, wherein the reactor is an industrial carbon black oil furnace reactor.

* * * * *